US009950685B1

(12) United States Patent
Deyaf et al.

(10) Patent No.: US 9,950,685 B1
(45) Date of Patent: Apr. 24, 2018

(54) 360 DEGREE INTRUSION DETECTION AND WARNING SYSTEM

(71) Applicant: Feniex Industries, Inc., Austin, TX (US)

(72) Inventors: Hamza Deyaf, Austin, TX (US); Nicholas Mazzanti, Austin, TX (US); Kyle Hale, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days.

(21) Appl. No.: 15/662,029

(22) Filed: Jul. 27, 2017

(51) Int. Cl.
| | | |
|---|---|---|
| *G01C 21/00* | (2006.01) |
| *B60R 21/12* | (2006.01) |
| *B60Q 3/80* | (2017.01) |
| *B60Q 3/70* | (2017.01) |
| *B60Q 9/00* | (2006.01) |
| *G01S 17/93* | (2006.01) |
| *G01S 17/42* | (2006.01) |
| *G01S 17/02* | (2006.01) |

(52) U.S. Cl.
CPC ............ *B60R 21/12* (2013.01); *B60Q 3/70* (2017.02); *B60Q 3/80* (2017.02); *B60Q 9/00* (2013.01); *G01S 17/023* (2013.01); *G01S 17/42* (2013.01); *G01S 17/936* (2013.01); *B60Q 2500/00* (2013.01)

(58) Field of Classification Search
CPC .............................. G01S 7/4811; G01S 17/936
USPC .......................................................... 701/300
See application file for complete search history.

(56) References Cited

U.S. PATENT DOCUMENTS

| | | | | |
|---|---|---|---|---|
| 3,585,584 A | * | 6/1971 | Behrend | B60R 25/04 340/430 |
| 5,612,668 A | * | 3/1997 | Scott | B60R 25/1012 340/426.13 |
| 9,522,650 B1 | * | 12/2016 | Turjancik | B60R 25/20 |
| 2005/0062602 A1 | * | 3/2005 | Fujiwara | B60R 25/102 340/539.1 |
| 2010/0053593 A1 | * | 3/2010 | Bedros | G01S 7/4811 356/5.01 |
| 2013/0242284 A1 | * | 9/2013 | Zeng | G01S 17/66 356/4.01 |
| 2015/0084755 A1 | * | 3/2015 | Chen | G08G 1/16 340/435 |
| 2016/0291134 A1 | * | 10/2016 | Droz | G01S 7/4802 |
| 2017/0082735 A1 | * | 3/2017 | Slobodyanyuk | G01S 7/4817 |
| 2017/0219713 A1 | * | 8/2017 | Gruver | G01S 17/89 |

* cited by examiner

Primary Examiner — Muhammad Shafi (57) ABSTRACT

Embodiments for use of an apparatus and method for alerting an occupant within a vehicle are provided. An apparatus may include a lidar unit configured to detect an oncoming intruder approaching a stationary vehicle. The lidar unit is mounted to an external surface of the stationary vehicle or coupled to an emergency vehicle warning device. An alarm is sounded or warning lights are triggered when the oncoming intruder approaches within a zone surrounding the vehicle. A method may include providing a controller unit and a lidar unit configured to detect the motion of any oncoming person, animal, or object approaching a stationary vehicle. The lidar unit rotates to scan the region surrounding the stationary vehicle and provides detection data. Upon detecting an oncoming intruder, the detection data is transmitted to the controller unit within the vehicle, and an alarm may be sounded to warn an occupant located within the vehicle.

16 Claims, 4 Drawing Sheets

FIG. 5

360 DEGREE INTRUSION DETECTION AND WARNING SYSTEM

FIELD OF THE DISCLOSURE

The illustrative embodiments relate generally to one or more embodiments for a detection and warning system. More specifically, the illustrative embodiments relate to a detection and warning system that is able to detect oncoming moving people or other objects approaching a stationary vehicle, and to alert an operator or occupant of the stationary vehicle of the oncoming moving people or other objects by sounding an alarm or flashing a set of warning lights and/or displaying their respective position with respect to the stationary vehicle.

BACKGROUND

For many people, a great deal of time is physically spent located in one's vehicle, even if the vehicle is not in motion and is stationary. It may be necessary to do a variety of tasks that may be accomplished while located in a vehicle. For example, such tasks may include checking one's email or messages on one's smartphone or other computing device, making and receiving phone calls, eating, sleeping, and engaging in a variety of tasks within one's vehicle. In addition to the above, many people spend an inordinate amount of time in their work vehicles as part of their occupational duties and obligations. For example, police officers or other law enforcement usually spend a great deal of time within their police vehicles because of their occupational obligations and assignments. When police officers are not driving their police vehicles, they are often found parked in various locations, during the day time and the night time. Such locations may include located on or adjacent to roadways and highways, parking lots, residential neighborhoods, and a variety of venues and locations. Furthermore, it is noted that other working professionals may also spend a great deal of time located within their vehicles, including security officers, public safety, construction, roadside assistance, and service repair professionals.

In general, when someone is working or concentrating on a task while located in their vehicle, he or she is not aware of his or her surroundings. This also means that a person inside the vehicle is probably not aware when other individuals are walking near or approaching his or her vehicle. If someone is approaching a stationary vehicle with an intent to harm the operator or occupants within the stationary vehicle, it may be easily accomplished because the occupants of the stationary vehicle usually have no warning and no means of detecting the movement of these oncoming individuals, particularly at night.

In the case of police officers, there have been too many tragedies that involve fatalities and serious bodily injury to the police officers that have occurred when these officers were simply parked within their police vehicles and were not aware of their outside surroundings or were otherwise focused on other tasks, and someone with an intention to harm these police officers, is able to walk up to the police vehicles undetected and open fire using guns and other weapons to attack the police officers within their vehicles.

Because such tragic situations are so frequently occurring to police officers, and also to many other types of individuals while located in their stationary vehicles, there is an immediate need for a system and apparatus that may be used to monitor an area around a vehicle and to alert the occupants located within a vehicle when a potential intruder approaches the vehicle.

SUMMARY

Embodiments are provided in the present description for a system designed to alert an occupant located within a stationary vehicle of the presence of an oncoming intruder or object. In one aspect, embodiments are provided in the present description of a system that includes a lidar unit. The lidar unit may be configured to detect the oncoming intruder or object with respect to a stationary vehicle. The lidar unit may be mountable to an external surface (or alternatively an internal surface) of the stationary vehicle. Alternatively, the lidar unit may be coupled to or integrated in an emergency vehicle warning device.

In addition to the above, a housing of the lidar unit may include a processor configured to receive lidar detection data about the oncoming intruder. Detection data provided by the lidar unit may include at least one of speed and distance of the oncoming intruder with respect to the stationary vehicle. The housing of the lidar unit may further include a controller unit having its own controller unit housing. The controller unit may be configured to receive the detection data about the oncoming intruder and may further be configured to alert the occupant with the vehicle by sounding an audible alarm or triggering one or more warning lights. The controller unit, in some embodiments, may include a transceiver coupled to the processor of the lidar unit and configured to receive the lidar detection data from the lidar unit.

In another aspect, embodiments herein are directed to a method for alerting, and ultimately, protecting an occupant located within a stationary vehicle from an oncoming intruder or object. A method, in some embodiments, may include providing a controller unit coupled to a lidar unit. The lidar unit may detect the motion of the oncoming person or object approaching a stationary vehicle. In certain embodiments, the lidar unit may be mounted to an external surface of the stationary vehicle or coupled to or located in an emergency vehicle warning device that is mounted to the external surface of the stationary vehicle. Further, a method may include rotating a body of the lidar unit continuously in a complete 360-degree revolution to scan a region surrounding a perimeter of the stationary vehicle. Further, a method may include obtaining, from the lidar unit, detection data for the oncoming person or object approaching the stationary vehicle and triggering an alarm sound or a set of warning lights to alert the operator of the stationary vehicle.

In yet another aspect, an apparatus is described herein that is configured for warning an occupant located within a stationary vehicle. In one or more embodiments, this apparatus may include a controller unit configured for vehicle related intrusion detection. A controller unit may be connectable to a lidar unit that is mountable to a surface of the stationary vehicle. Further, the controller unit may be configured to receive detection data from the lidar unit indicating an oncoming intruder or object and to trigger an alarm sound or a set of warning lights in accordance with the detection data. Beneficially, the controller unit may include a display for displaying a position of the intruder with respect to the stationary vehicle. Further, in some embodiments, the controller unit may further display the location of the intruder or object with respect to a particular zone relative to the stationary vehicle so as to provide a more precise visual indication to the occupant of the stationary vehicle where to look to determine the threat level of the oncoming intruder. It is anticipated that one or more components described herein may be particularly suited for use with an emergency vehicle.

Other aspects and advantages of the invention will be apparent from the following description and the appended claims.

DETAILED DESCRIPTION

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item.

In the following discussion and in the claims, the terms "including" and "comprising" are used in an open-ended fashion, and thus should be interpreted to mean "including, but not limited to . . . ."

As a preface to the detailed description, it should be noted that, as used in this specification, the singular forms "a", "an", and "the" included plural referents, unless the context clearly dictates otherwise.

The one or more embodiments described in the present description recognize that there are a variety of scenarios where vehicles may be parked in various locations, including parking lots, roadways, neighborhoods, and that the operators or occupants located within the vehicles may not be aware of any oncoming intruders who approach their vehicles with the intention to harm the occupants within the vehicles. Further, the one or more embodiments recognize that a detection and warning system is much needed and long overdue to provide a warning that will provide a minimum amount of time for the occupant within the parked vehicle to be notified and to take steps to protect themselves, if needed, after assessing the threat or danger risk of the detected oncoming person.

One foreseeable application for such a vehicle-related intruder detection and warning system is for police officers and other types of law enforcement personnel. As discussed above, as part of their professional duties and responsibilities, law enforcement personnel routinely use their police vehicles to drive themselves or other individuals from location to location, and are frequently located within their vehicles. These vehicles are often found parked on the side of a road, highway, neighborhood, or other venue, while the officer may be conducting work related tasks, including, but not limited to, checking their computing devices that are located in the vehicle, receiving instructions for their next assignments, monitoring traffic and/or assisting other people. Police vehicles and other law enforcement vehicles are usually marked as such, with large letters located on the sides of their vehicles indicating that these vehicles belong to the police and/or agency within a certain county, city, or region. Additionally, law enforcement vehicles may have a number of other identifying warning lights and sirens that are visibly mounted and attached to these vehicles.

There have been a number of instances where police and other law enforcement officers were targeted while parked in their work vehicles by intruders who stealthily approached the work vehicle from one side or the other, and were able to either shoot or otherwise attack the officers while the officers were located within their vehicles. Many of these officers were unfortunately killed or seriously injured.

It is a goal of one or more embodiments of an intruder detection and warning system provided in the present description to warn police and other law enforcement of potential oncoming intruders and to prevent or minimize any attacks on these officers by the oncoming intruders. While the above-provided description of one intended application of an intruder and detection system has been for police officers and other law enforcement personnel, it is in no way intended to limit the application of one or more embodiments of a vehicle-related intruder detection and warning system as described herein solely to police or other law enforcement vehicles or personnel. Those of ordinary skill in the art will appreciate that there may be numerous applications and uses by a variety of individuals of an intruder detection and warning system as described herein.

Therefore, it is noted that any occupant of a vehicle, without limitation as to his or profession or purpose in the vehicle, may benefit from having an intruder detection and warning system that assists in keeping the occupant within the vehicle aware of his or her surroundings. For example, many ordinary citizens and individuals may have good reasons for wanting an intruder detection and warning system associated with their vehicle in accordance with the one or more embodiments described herein to provide additional security. These days, many people are stalked or harassed by strangers or people that they know, and it may be helpful to have an intruder detection and warning system as described herein to further protect oneself.

Further, there are professions that continuously expose the occupants of vehicles to more risk of interaction with dangerous or ill-intentioned individuals who may either try to attack the occupants for their professional associations and/or any items or money that may be located within their vehicles. For example, personal armored vehicles and their drivers may benefit from having an intruder detection and warning system as described herein.

Additionally, emergency and medical or safety (EMS) personnel may also benefit from having an intruder detection and warning system as described herein. EMS personnel are often working to assist an injured party whether located on a highway or roadway, or in various neighborhoods, and are also frequently stationed in their work vehicles (e.g. ambulances or other paramedic vehicles) and may park in certain locations to either await their next assignment or to work on one or more work related tasks within their vehicles. It is foreseeable that EMS personnel may also benefit from having an intruder detection and warning system in accordance with one or more embodiments as described herein to warn them of any possible oncoming intruders who may intend them harm or to attack and steal items located within their work vehicles.

In addition to the above, taxi and private car drivers, bus drivers, construction and roadside personnel, as well as numerous other individuals, may advantageously have an enhanced sense of security and protection by using the intruder and detection system as described herein to notify them of any approaching individuals and to be able to assess whether there is a risk of danger to their personal safety. Detailed embodiments for an intruder detection and warning system are provided below in relation to the Figures presented herein.

Figure 1:
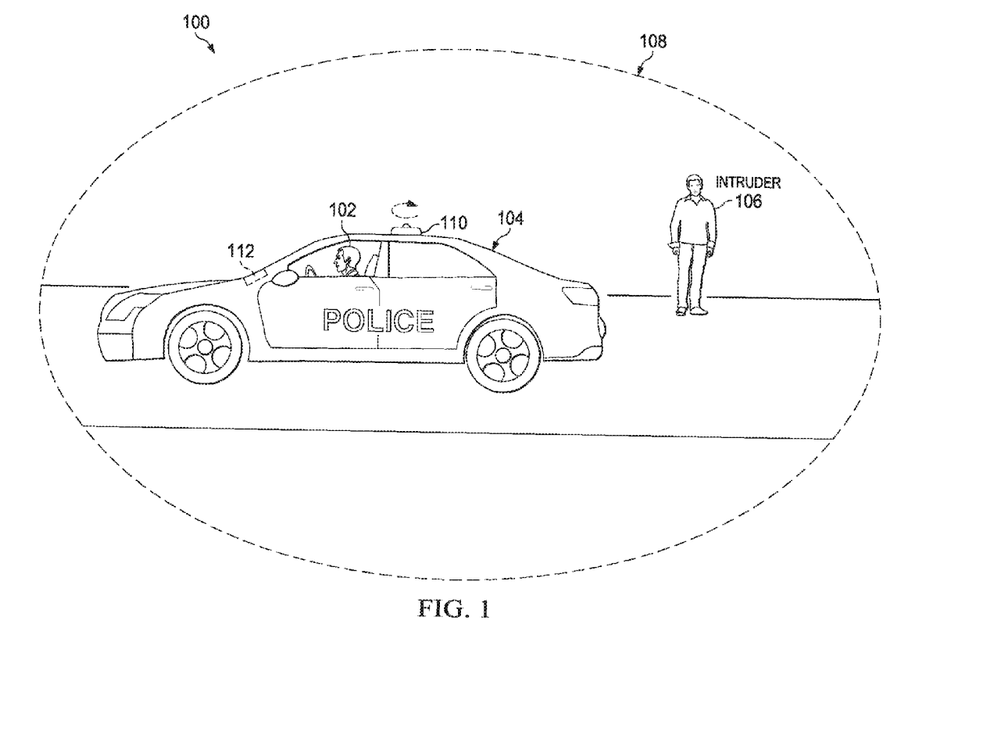
FIG. 1 is pictorial illustration of an intruder detection and warning system mounted on a vehicle in accordance with an illustrative embodiment.

Turning to FIG. 1, FIG. 1 shows a pictorial illustration of an intruder detection and warning system mounted on a vehicle as used by an occupant located within a parked or stationary vehicle. The intruder detection and warning system 100 shown in FIG. 1 may include a number of components as described further below in the present description. In FIG. 1, occupant 102 is an individual located within vehicle 104. Occupant 102 may also be the operator of vehicle 104 in one or more embodiments. Vehicle 104 may be parked in a location so that occupant 102 may monitor the surrounding area or may accomplish various tasks or duties. In one non-limiting exemplary embodiment, vehicle 104 may be a police vehicle, which is illustrated in FIG. 1. However, those of ordinary skill in the art will appreciate that vehicle 104 may be any type of vehicle and may be associated with various types of professions and individuals.

In one exemplary scenario, whereby, vehicle 104 is a police vehicle and parked in an area of interest to occupant 102, it may be that an intruder, such as intruder 106, attempts to approach vehicle 104. If intruder 106 has intention to harm occupant 102 of vehicle 104, the intruder 106 will most likely approach vehicle 104 in a surreptitious manner to avoid detection by occupant 102 of vehicle 104. For example, oncoming intruder 106 may approach stealthily and carefully from behind vehicle 104 so as to avoid being seen or spotted by occupant 102. Further, if occupant 102 happens to be looking down and not scanning his or her surroundings, such that his or her attention is focused elsewhere, occupant 102 will not be likely to observe intruder 106 as intruder 106 approaches and gets near to stationary vehicle 104.

An intruder detection and warning system 100 as shown in FIG. 1 may include a number of components that may be used to alert and sound an audible alarm (and or flash one or more warning lights) to draw the attention of occupant 102 that intruder 106 is approaching vehicle 104. In one or more embodiments, a lidar operated unit, such as lidar unit 110, may be used to notify occupant 102 of the approaching individual or possible intruder 106 (or other approaching object, such as a car, or an animal, or any other approaching entity). Lidar unit 110 may be mountable to a surface of vehicle 104, and a body of lidar unit 110 may be configured to rotate continuously in a 360-degree direction when activated. Accordingly, lidar unit 110 may be configured to scan the surrounding region around vehicle 104, and may particularly be configured to detect any objects, including people, that enter within a range 108 surrounding vehicle 104. Lidar unit 110, may utilize lidar based technology and systems, to detect that intruder 106 has entered with a predetermined detection range, such as range 108, surrounding vehicle 104. In certain embodiments, the detection range may be set by the user, and may be set to any value within a detection range of 5-100 meters (without limitation thereto. Further, the detection range of lidar unit 110 may be set by the radio frequency (RF) components and circuit of the lidar unit 110 (e.g., the laser light transmitter and receiver as well as the power amplification). Thus, the detection range, such as range 108, as used throughout the present description, may be variable or may be configured to be predefined by a manufacturer setting.

In one or more embodiments, lidar unit 110 may be coupled to a controller unit, such as controller unit 112. Controller unit 112 may be located within the line of sight and/or proximate to occupant 102 while located inside the parked vehicle 104. When lidar unit 110 detects that intruder 106 has entered a predetermined area surrounding vehicle 104, a loud alarm may be emitted from controller unit 112. Alternatively, or additionally, one or more warning lights may be triggered to flash from a light source of the vehicle, including an emergency vehicle warning device (e.g. emergency vehicle warning device 390 shown in FIG. 3) coupled to the stationary vehicle. Once the alarm is sounded and/or warning lights flashed, occupant 102 will be alerted that someone or something has entered within range 108 of vehicle 104, and will know to assess whether there is a danger or risk posed by the that approaching person. Thus, occupant 102 may have enough time to react and to either flee the location or to take steps to protect himself or herself. Additionally, another benefit of having a loud alarm sounding and/or lights once intruder 106 has been detected within range 108 is that the alarm may scare off intruder 106, such that intruder 106 may choose to flee the scene, which also avoids any harm or danger happening to occupant 102.

It is foreseeable that a system, such as intruder and detection system 100, may be especially useful at night when occupant 102 may be located in a dark area that is dimly lit and/or other conditions that make it difficult to see, such as when there is fog or inclement weather. Further, it is foreseeable that system 100 may be useful if occupant 102 is located in his or her parked vehicle 104 in a location where there is known criminal activity or high risk of attack by other people, such as in dangerous warzones for example.

As discussed above, law enforcement and various types of security officers are often targeted for attack while in their vehicle by dangerous criminals or assailants, because of their easily identifiable police and security vehicles. People who have an intention to harm these officers will try and find the officers and attack them in situations where they may be vulnerable and easily caught off guard, such as, while the officers are focused on their tasks and parked within their vehicles. Additionally, armored transport personnel while in professional armored vehicles are also frequently targeted because their vehicles usually transport large amounts of money and other valuable items. These are just some examples of individuals and scenarios where it may be useful to have a vehicle intruder detection and warning system as described above.

As shown in FIG. 1, lidar unit 110 may be mounted on a surface of vehicle 104. In an exemplary embodiment, lidar unit 110 may be centrally mounted on a roof or other external surface of vehicle 104, although any other suitable location on or in vehicle 104 may alternatively be used. It may be preferred, in one or more embodiments, to have lidar unit 110 centrally mounted on a roof of vehicle 104 so that lidar unit 110 is able to complete a full 360 degrees without any obstruction and scan the full 360-degree range (ex. range 108) around vehicle 104. Lidar unit 110 may include a housing that comprises or is coupled to one or more electrical and/or mechanical components that operate to implement one or more functions described below.

Lidar unit 110 may be permanently or removeably coupled to a surface of vehicle 104 using any affixation techniques or methods known in the art. Such affixation methods may include, without limitation thereto, using fasteners, ties, cables, adhesives, or soldering/welding to affix lidar unit 110 to a surface of vehicle 104. Alternatively, in one or more embodiments, lidar unit 110 may be removeably coupled to a base (not shown), whereby the base is permanently coupled to vehicle 104, but the operator or owner of lidar unit 110 (i.e. occupant 102) may remove and re-attach lidar unit 110 as desired.

Lidar unit 110 may incorporate a laser based object detection system that uses ultraviolet, visible, or near infrared light to image and detect incoming intruders or other objects. LIDAR is known by those skilled in the art as "Light Detection and Ranging." LIDAR is a technology that generally functions as a surveying method that measures distance to a target by illuminating that target with a pulsed laser light, and measures the reflected pulses with a sensor. Differences in laser return times and wavelengths can then be used to make digital 3D-representations of the target. In certain non-limiting embodiments, lidar unit 110 may be activated to detect any person, car, animal, or any type of object that enters within the detection range.

As shown in FIG. 1, in one or more embodiments, a detection zone or range 108 may extend over a specific range that extends all around vehicle 104. As noted above, the detection range may be set by the user in certain embodiments. For example, in a crowded environment with a lot of passerby's and people located near the stationary vehicle, the operator of the lidar unit 110 may set the detection range 108 to be narrower than in an uncrowded area. Thus, in an open area, an operator of the lidar unit 110 may set the detection range 108 to cover a larger area and thus receive an earlier alert when an intruder or other object enters the detection range 108. Those of ordinary skill in the art will appreciate that it in alternative embodiments, default predetermined detection ranges may be used by lidar unit 110. Specifically, lidar unit 110 may detect any oncoming intruders (e.g. intruder 106) or another object that enters a predetermined range 108 around a perimeter of vehicle 106. Further, lidar unit 110 may be configured to rotate in a full 360-degree revolution (e.g. continuously or for a set number of revolutions over a period of time) so as to scan the entire perimeter of vehicle 106 and detect the motion of people entering range 108.

Figure 2:
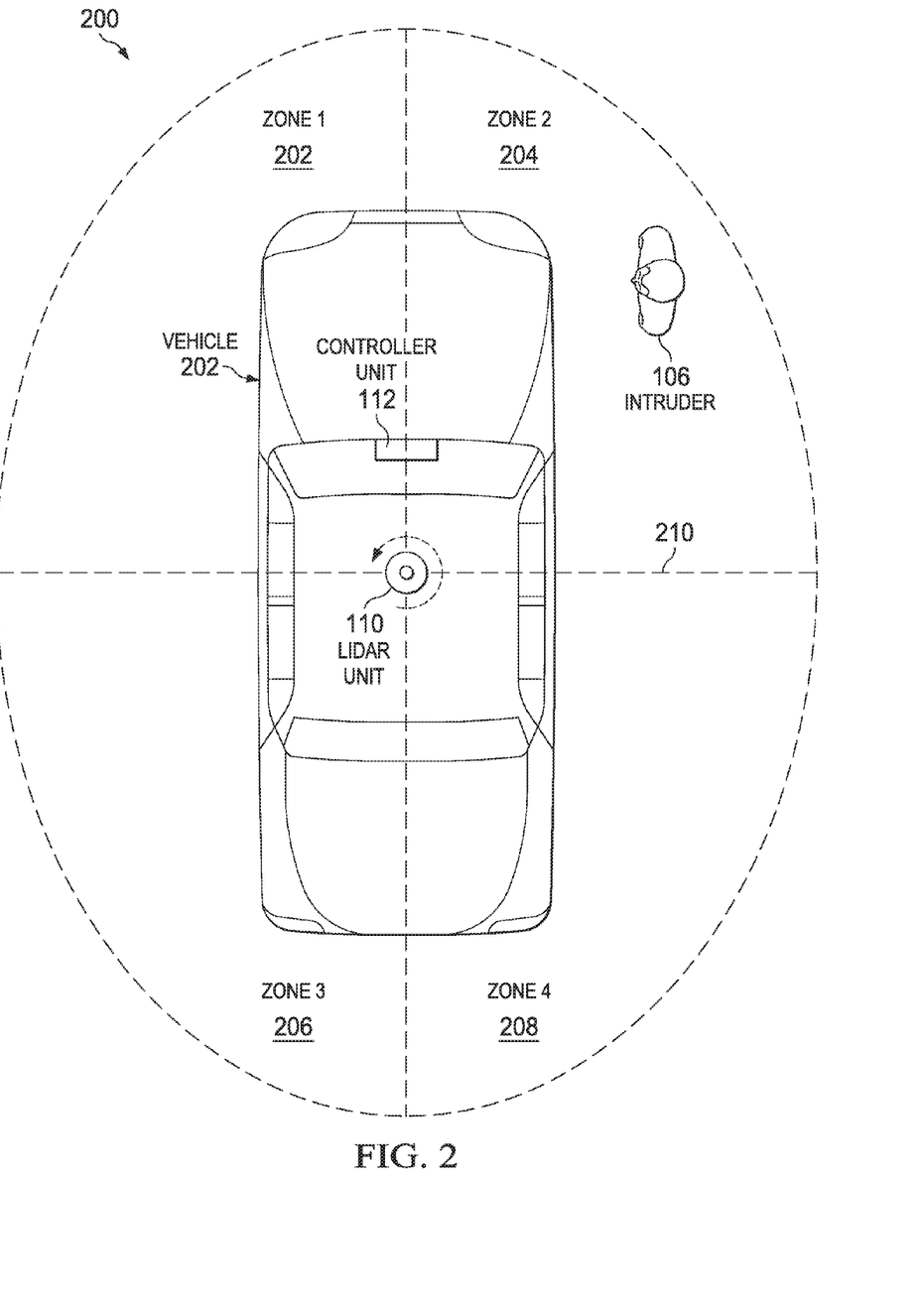
FIG. 2 is a pictorial illustration of components of a vehicle related intruder detection and warning system that detects an oncoming person's position with respect to a set of zones associated with the vehicle in accordance with an illustrative embodiment.

Lidar unit 110 may be configured to detect a speed, distance of oncoming intruder 106 with respect to vehicle 104, and a particular position of intruder 106 with respect to assigned zones around vehicle 104 (as elaborated upon in FIG. 2).

Intruder warning and detection system 100, in one or more embodiments, may further include controller unit 112. In one embodiment, controller unit 112 may be mounted to a surface of vehicle 104, and in particular, be mounted to an internal surface located within vehicle 104. Controller unit 112 may perform a number of functions. For example, controller unit 112 may be configured to receive detection data provided by lidar unit 110, and be used, in one or more embodiments, to emit an alarm from a speaker located in or coupled to controller unit 112. An alarm sound emitted by controller unit 112 has the effect of drawing occupant's 102 attention to the presence of oncoming intruder 106. Further, in one or more embodiments, controller unit 112 may include a display (e.g. a grid type display and/or a touchscreen interface) that may be used to display what zone or general location with respect to vehicle 104 that oncoming intruder 106 may be located within.

Turning to FIG. 2, FIG. 2 shows a block diagram of a system that utilizes a vehicle related intruder detection and warning system having a lidar unit in accordance with an illustrative embodiment. System 200 shown in FIG. 2 includes vehicle 202, as well as lidar unit 110 which may be coupled to a surface of vehicle 202. As shown in FIG. 2, it may be preferred, in one or more embodiments, for lidar unit 110 to be mounted in a general central position on a top surface of a vehicle. However, other suitable positions may also be utilized and are not limited thereto. It is noted that the particular structure and design of each vehicle may affect where a user determines to position lidar unit 110.

As shown in FIG. 2, a controller unit, such as controller unit 112 may also be mounted to a surface of a vehicle. In an example, controller unit 112 may be located within an internal body of vehicle 202 and located proximate to a driver or passenger of vehicle 202.

According to embodiments of the present disclosure, lidar unit 110 may be configured to detect intruder 106 as he or she approaches vehicle 202 and to also detect which "zone" or quadrant intruder 106 is located in. As shown in FIG. 2, lidar unit 110 may be configured to scan within a set distance of lidar unit 110. Further, the area surrounding lidar unit 110 (i.e. the area surrounding a perimeter of vehicle 202) may be divided up into "zones." As shown in FIG. 2, the area surrounding vehicle 202 is divided up into four equal zones. It is noted that other sizes and number of zones may be suitable in alternative configurations as well.

Figure 4:
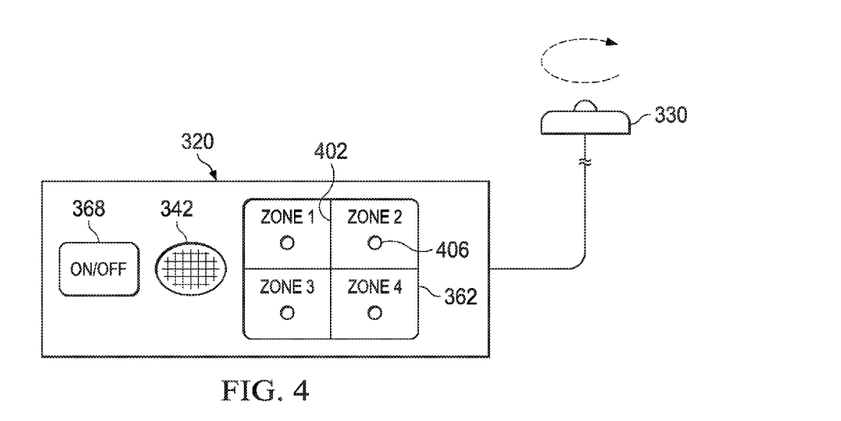
FIG. 4 is a block diagram of an embodiment of a controller unit coupled to a lidar unit in accordance with an illustrative embodiment.

As shown in FIG. 4, there are four possible zones of intrusion around vehicle 202. "Zone 1" 202, "Zone 2" 204, "Zone 3" 206 and "Zone 4" 208 are four zones of intrusion that have been evenly divided into quadrants as if over a 360-degree grid (i.e. grid 210). Thus, lidar unit 110 may be configured to scan the full 360-degree perimeter surrounding vehicle 202 and correlate the data that lidar unit 110 receives upon detecting an intruder to a particular zone. Those of ordinary skill in the art will appreciate that in alternative configurations lidar unit 110 may not include zones of detection. Alternatively, there may be a greater or lesser number of zones of detection that lidar unit 110 may be configured to scan.

In one or more embodiments, controller unit 112 may include a display device, which is elaborated upon further below with respect to FIG. 3 and display 362 in controller unit 320. A display on controller unit 112 may be configured to visually display and generally visually indicate to the occupant of vehicle 202 (e.g. occupant 102) which zone intruder 106 has been detected in. Thus, it is an objective of this embodiment that occupant 102 may receive an audible warning when intruder 106 approaches vehicle 202 and also have an indication as to intruder's 106 general position or location with respect to vehicle 202. This visual indication of a position of the intruder 106 may allow occupant 102 to look towards the indicated zone and to verify whether intruder 106 is really a threat or is just a person approaching vehicle 202 and is harmless.

Figure 3:
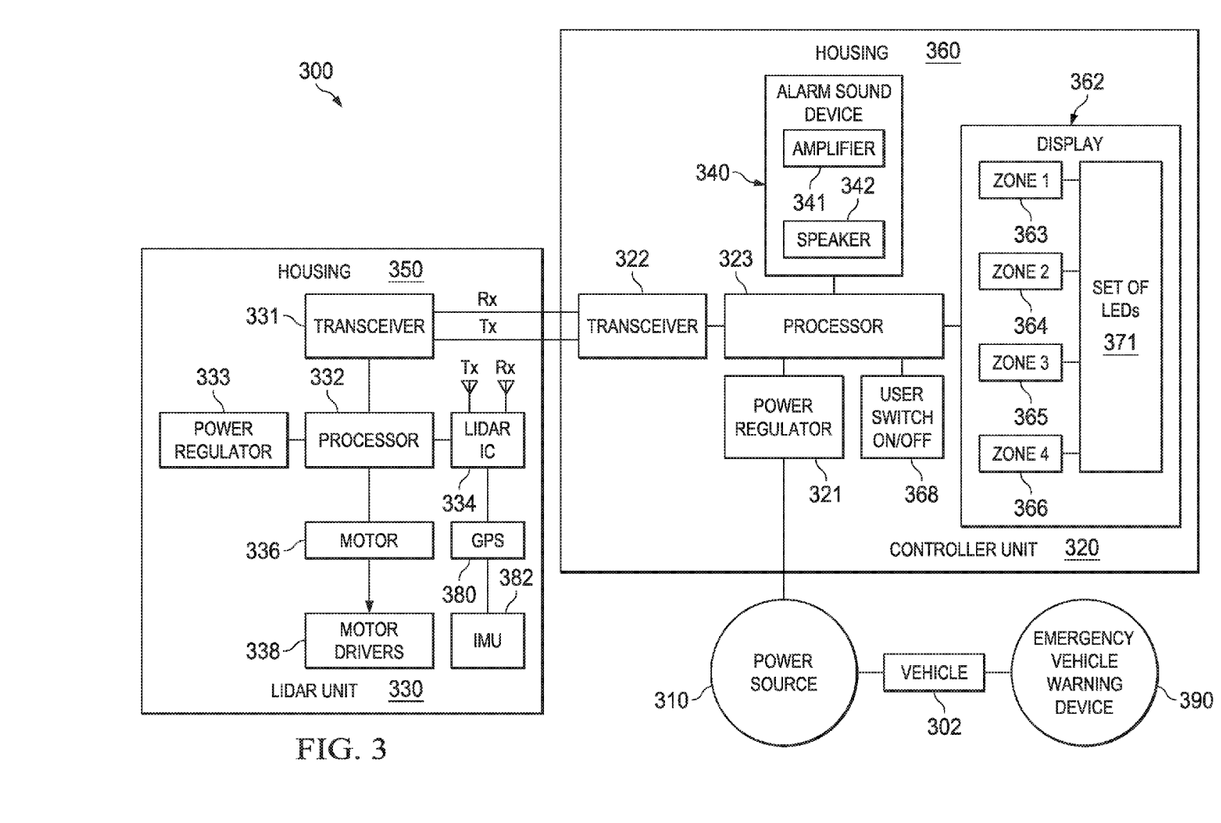
FIG. 3 is a block diagram of components of a vehicle related intruder detection and warning system in accordance with an illustrative embodiment.

Turning to FIG. 3, FIG. 3 shows a block diagram of an exemplary vehicle related intruder detection and warning system 300. Intruder detection and warning system 300 may be in accordance with intruder and detection systems 100 as shown in FIG. 1 and 200 as shown in FIG. 2 and as previously described above. Intruder detection and warning system 300 of FIG. 3 may further include any or all of the component shown in FIG. 1 or 2.

As shown in FIG. 3, intruder detection and warning system 300 may be implemented and located on a vehicle, such as vehicle 302. Vehicle 302 may be in accordance with vehicle 104 as shown in FIG. 1 and vehicle 202 as shown in FIG. 2. Vehicle 302 may be any type of suitable vehicle known in the art including road vehicles, off-road vehicles, wheel-based vehicles, special track vehicles, or other driven vehicles. This further includes, without limitation, motorcycles and/or other two or three wheeled vehicles. In one or more embodiments, vehicle 302, as used during a process associated with a controller unit, such as controller unit 320 or lidar unit 330, is stationary. Thus, when he or she activates controller unit 320 to receive detection data provided by lidar unit 330, the operator or occupant of vehicle 302 may be located in a stationary vehicle.

In some embodiments, vehicle 302 may be an emergency vehicle. An emergency vehicle includes any one of a law enforcement vehicle, a fire department vehicle, an emergency medical vehicle, a public utility vehicle, an armored car vehicle, a tow truck, or a construction vehicle. A law enforcement vehicle may be a vehicle utilized by a law enforcement agency or organization. A law enforcement vehicle may be, without limitation, a police car, a SWAT van, a search and rescue vehicle, a personal armored vehicle, or any other emergency vehicle. A law enforcement agency or organization may be, without limitation, a police department, a sheriff's department vehicle, U.S. Marshal Service vehicle, or any other law enforcement vehicle.

An emergency medical vehicle may be a vehicle for transporting a sick or injured person. An emergency medical vehicle may be, for example, an ambulance. A fire department vehicle may be, for example, a fire truck. A public utility vehicle is a vehicle used by a utility, such as the water department, an electric power utility provider, a gas utility provider, and other public works vehicles. A tow truck is a vehicle for towing one or more other vehicles. A tow truck may also be referred to as a wrecker. Occupant 102 may be located within any of these vehicles listed above, and lidar unit 330 and controller unit 320 may be mounted or otherwise attached to a surface of the vehicle.

Additionally, any of the emergency vehicles noted above, including vehicle 302, may optionally include one or more emergency vehicle warning devices, such as, emergency vehicle warning device 390. Emergency vehicle warning device 390 may include any type of visual and/or acoustic warning device particularly suited for emergency vehicles (as defined above) that may be attached to or otherwise mounted to any exterior and interior surfaces of a vehicle. Emergency vehicle warning device 390 may comprise a visual and/or acoustic warning device. Examples of emergency vehicle warning device 390 may include, but is not limited to, any type of light bar, sirens, and/or speakers as known in the art or as yet to be developed. Emergency vehicle warning device 390 may be mountable to a surface of vehicle 302 (using any mounting or attachment method as desired), including, but not limited to an external surface of vehicle 302. In one preferred embodiment, emergency vehicle warning device 390 may be mountable to an outside of a roof of vehicle 302. It is noted that emergency vehicle warning device 390 may obtain power from the battery located within vehicle 302 or may include or be coupled to its own alternative source of power.

In one or more embodiments, intruder detection and warning system 300 shown in FIG. 3 includes a number of operatively connected components, such as, controller unit 320, a lidar unit 330, and an alarm sound device 340, whereby the alarm sound device 340 may warn the occupant, such as occupant 102 using one or more loud alarms. It is noted that controller unit 320 as discussed below with respect to FIG. 2 may be in accordance with controller unit 112 as shown in FIGS. 1 and 2, and lidar unit 330 as discussed below may be in accordance with lidar unit 110 as shown in FIGS. 1 and 2.

In one or more embodiments, system 300 obtains its necessary power to operate one or more devices and components described herein from a power source, such as power source 310. Power source 310 supplies power to these components via suitable wiring. In one embodiment, without limitation thereto, power source 310 may be a vehicle battery located in vehicle 302 that supplies the components with power. Examples of vehicle batteries that may serve as a power source, such as power source 310 may include, but are not limited to, lead-acid batteries used in fuel vehicles, or lithium-ion batteries used in electric or hybrid vehicles. Further, one or more components of system 300 may be connected to vehicle battery 302 via a cigarette lighter located in vehicle 302. In order for the detection and warning system 300 to be activated, when power source 310 is the vehicle battery, vehicle 302 should be powered on or at least in accessories mode in order for the detection and warning system 300 and attached components to receive power.

In alternative embodiments, power source 310 may not be a vehicle battery. Rather, in some embodiments, controller unit 320 may include its own power source 310, as can lidar unit 330, or alternatively, each component is collocated in a common housing of a single device that includes its own power source 310. Accordingly, in some embodiments, power source 310 may be any type of electric battery known in the art that supplies electricity to one or more components in system 300. This may include, but is not limited to, single-use, disposable batteries. In alternative configurations, power source 310 may be solar-powered.

The controller unit 320 and the lidar unit 330 may be connected to the power source 310 via wires or electric cables in any suitable arrangement. For example, the components may be supplied power from the power source 310 directly or through other components. In one implementation, any one of the components may be connected to the power source 310 and, in turn, supply some of the power to the other components via a cable. In one or more embodiments, the controller unit 320 may also include a power regulator 321 connected to the power source 310 to regulate power provided by power source 310 and distributed to one or more components.

In one or more embodiments, the controller unit 320 and the lidar unit 330 may each be separate components that are connected via any suitable wired or wireless connections. Thus, in some embodiments, controller unit 320 has its own housing 360 that includes one or more components, and lidar unit 330 has its own housing 350 as well. It is noted that in an embodiment, the controller unit 320 and the lidar unit 330 may be connected via an RJ45 serial cable (or any other type of cable). Alternatively, the controller unit 320 may be integrated with one or both of the lidar unit 330 and the alarm sound device 340 in a single apparatus or device having a common housing.

Further, while alarm sound device 340 is shown as being integrated or included within a housing of controller unit 320, in alternative embodiments, alarm sound device 340 as well as its components as shown in FIG. 3, may be located in another device or housing separate from controller unit 320. Alternatively, or additionally, alarm sound device 340 may be located within a portable computing device (not shown) associated with occupant 102, whereby the portable computing device may be, but is not limited to, a smartphone, smart communications device, or any type of computing device as known in the art. The portable computing device can be coupled to either the controller unit 320, lidar unit 330, or both in any suitable wired or wireless connection, such as, but not limited to, an auxiliary cable, a universal serial bus (USB) connection, or a Bluetooth link.

Controller unit 320 and lidar unit 330 may be of any suitable size, dimension, or shape, and made of any materials known in the art. In one or more embodiments, controller unit 320 and lidar unit 330 are separate devices or apparatuses. In an embodiment, controller unit 320 is connected via wires to lidar unit 330, such that one of ordinary skill in the art may connect a wire from end to controller unit 320 and run the wire in a concealed manner within a body of vehicle 320 so that the other end of the wire may connect to lidar unit 330. Alternatively, or additionally, controller unit 320 and lidar unit 330 may be connected wirelessly using one or more wireless technologies and protocols.

Controller unit 320 may be located anywhere that is suitable for occupant 102, including being located next to or proximate the occupant 102 when occupant 102 is sitting in the driver or passenger seat in vehicle 202. For example, and without limitation thereto, controller unit 320 may be mounted to the front dashboard inside of vehicle 104 such that occupant 102 has easy access and visibility of controller unit 320. It is noted that controller unit 320 may be positioned in other locations that may be suitable to occupant 102, including on a window or door within vehicle 302 or attached to a front panel located on the side of a front portion of vehicle 302. Generally, it is an objective that controller unit 320 may be easily accessible to a user so that the user may easily power on and off the controller unit 320 (e.g. via user on/off switch 368) and also see the contents displayed on display device 362. Notwithstanding the above, there may be circumstances whereby it is desirable for controller unit 320 to be positioned on a rear surface of vehicle 302 and/or remote from a driver of vehicle 302.

Lidar unit 330 may have a housing, such as housing 350, that contains one or more electromechanical components of lidar unit 330. It is noted that lidar unit 330 may be mounted anywhere on an external surface of vehicle 302. Lidar unit 330, as noted above, may in a preferred embodiment may be fixedly mounted to a top of a roof of vehicle 302. Accordingly, it may be preferable for housing 350 of lidar unit 330 to be formed as a water-resistant, durable housing suited for exposure to the elements, including heat, rain, snow, or other environmental conditions.

A body of lidar unit 330 may rotate in a 360-degree direction, and may rotate in either a clockwise or counterclockwise direction, or both. Lidar unit 330 may thus scan and detect any oncoming people or other objects from a higher vantage point that is able to cover more ground and detect oncoming intruders or other objects surrounding a perimeter of vehicle 302.

Lidar unit 310 may use lidar, which as understood by those skilled in the art, is a laser based object detection system that uses ultraviolet, visible, or near infrared light to image objects (including people). In one or more embodiments, lidar unit 310 can target a wide range of materials, including non-metallic objects. As known in the art, lidar unit 310 uses pulse laser detection to send out a predetermined series of light pulses with a known time interval between each pulse to a target. Through an averaging process, lidar unit 310 may be configured to calculate time over distance to measure the time the light pulses travel between the transmit and receive sensors resulting in an accurate speed and range detection.

Lidar unit 310 and/or lidar integrated circuit (IC) 334 may include a number of other components, as understood by those skilled in the art, to determine any necessary calculations and to detect incoming objects. Thus, lidar unit 330 includes a number of electromechanical components for detecting objects within a range of detection, such as range of detection 108 as shown in FIG. 1. The range of detection may be defined by the components or circuit of the lidar unit 330, and may be predetermined or preconfigured by a manufacturer of lidar unit 330 and may be a default setting for lidar unit 330.

Alternatively, or additionally, a user may be able to selectively determine and configure the range of detection on lidar unit 330 as desired by the user. As noted above, a user may choose to narrow the range of detection (e.g. 108) when the user is in a crowded area that is full of people and objects, so as to avoid constantly triggering an alarm unnecessarily. Conversely, when a user is in an open, uncrowded area, the user may choose to broaden the range of detection (e.g. 108) and thus receives an alert over a wider area when any intruder or object enters this broader detection range. Controller unit 320 and/or lidar unit 330 may include one or more switches (not shown) for varying or altering the detection range used by lidar unit 330 to detect an oncoming intruder or object.

The components of lidar unit 330 may include, without limitation, a lidar integrated circuit (IC) 334 for transmitting and receiving light in the form of pulsed laser signals. Lidar unit 330 may use any suitable lasers and sensors to detect a motion of intruder 106. Lidar unit 330 is a laser based object detection system that uses ultraviolet, visible, or near infrared light to image objects and people. For instance, in certain embodiments, lidar IC 334 includes, without limitation, a suitable laser light source, a laser cavity design (e.g., with mirrors or other reflectors), and a light detector. In one or more embodiments, lidar unit 330 can target a wide range of materials, including non-metallic objects. As known in the art, lidar unit 330 uses pulse laser detection to send out a predetermined series of light pulses with a known time interval between each pulse to a target. Through an averaging process, lidar unit 330 may be configured to calculate time over distance to measure the time of flight between the transmit and receive sensors resulting in an accurate speed and range detection. Thus, lidar unit 330 may collect detection data of a speed of an intruder, such as intruder 106, who is approaching vehicle 302. Further, lidar unit 330 may collect detection data of a distance of intruder 106 from vehicle 302. Upon collecting the speed and distance of intruder 106 with respect to vehicle 302, lidar unit 330 may also detect a particular position of intruder 106 with respect to vehicle 302 (as further elaborated on below with respect to display device 362 and zones of detection). Because lidar unit 330 is mounted to vehicle 302, it may be necessary for lidar unit 330 to determine its absolute position and orientation of lidar unit 330 in order to retain useable detection data. Accordingly, lidar unit 330 may include a number of other components to determine its calculations, including, but not limited to a Global Positioning System (GPS) 380 and Inertial Measurement Unit (IMU) 382 that are configured to provide a position and orientation of lidar unit 330.

In one or more embodiments, a processor 332 in lidar unit 330 processes the received signal from the lidar IC 334 to determine the presence of an object or person located in the range of detection (e.g. range 108 shown in FIG. 1). The processor 332 in lidar unit 330 may also process the signals to detect the speed and/or distance of the moving object from vehicle 302. The detection data is sent by a transceiver 331 in the lidar unit 330 to the transceiver 322 in the controller unit 320. The lidar unit 330 may also include a power regulator 333 connected to the power source 310 to regulate power distributed to lidar unit 330 via power source 310.

Lidar unit 330 may further include or be coupled to a motor, such as motor 336. Motor 336 may be configured to rotate a body of lidar unit 330 over a complete 360-degree rotation or revolution about a vertical axis. In one embodiment, lidar unit 330 is configured to pan 360 degrees about a vertical z-axis so as to scan a region surrounding the outer perimeter of vehicle 302. As known in the art, a panning motion may also be referred to as yaw. In one embodiment, lidar unit 330 may return to a center position upon completing a full revolution.

Processor 332 may be any chip or electronic board suitable for processing digital data, and may further provide the necessary signals to actuate set of motor drivers 338 that actuate motor 336. Motor 336 may be any type of suitable motor known in the art, without limitation. In one or more embodiments, lidar unit 330 may include mounting lidar unit 330 on one or more gimbals. A gimbal, as known by one of ordinary skill, may be a pivotable support system that allows the rotation of an object about an axis. Additionally, lidar unit 330 may be mounted to a surface (preferably external surface of vehicle 302) using any type of bracket, fasteners, and other components useful for mounting lidar unit 330 to a surface of vehicle 302.

Further, in one or more embodiments, lidar unit 330 may be coupled to or may be provided within a housing of an emergency vehicle warning device, such as emergency vehicle warning device 390. In one preferred embodiment, lidar unit 330 may be attached to or included within an interior housing of an emergency vehicle light bar, including any type of light bar known in the art. Alternatively, lidar unit 330 may be attached to or located within the housing of an acoustic emergency vehicle warning device. Acoustic vehicle warning devices may include, without limitation, sirens and speakers.

Further, in one or more embodiments, when an alarm is triggered, one or more warning lights may also be triggered to alert an occupant of vehicle 302. The one or more warning lights may be included in an emergency vehicle warning device, such as emergency vehicle warning device 390. Alternatively, or additionally, the one or more warning lights may originate from any type of light source located in or coupled to vehicle 302, including any lights built into the interior or exterior of the vehicle 302. In one or more embodiments, the one or more warning lights may be triggered to light up in a steady state or in flashing mode to further draw attention to the occupant of vehicle 302 of the oncoming intruder or object and to attract attention to the stationary vehicle 302. Also, having these warning lights, whether in steady state or flashing mode, may advantageously scare away any ill-intentioned oncoming intruder or an approaching animal or other type of object. When the one or more warning lights are included in an emergency vehicle warning device 390 that is also a light bar, it is possible that the one or more warning lights are displayed as having multiple colors and in a flashing mode from the emergency vehicle light bar. Those of ordinary skill in the art will appreciate that any number of colors or flashing patterns may be used when triggering one or more warning lights.

Further, when an intruder or other object is detected approaching the stationary vehicle, the system may trigger an alarm sound (e.g. from speaker 341 of controller unit 320), or only one or more warning lights, or both an alarm sound and one or more warning lights may be triggered to occur at the same time. In some applications, having both an alarm sound and triggering one or more warning lights may maximize the effectiveness of the system in both alerting the occupant of the stationary vehicle 302 of an oncoming intruder or object and also possibly scaring off the oncoming person or object. In some applications, controller unit 320 may be preprogrammed to trigger only an alarm sound or one or more warning lights or both. Alternatively, a user may select whether to solely trigger an audible, visual, or both types of alarms from one or more devices of stationary vehicle 302. Thus, in some embodiments, there may be one or more switches on controller unit 320 provided for the occupant of stationary vehicle 302 to select what types of alarms to trigger.

Those of ordinary skill in the art will appreciate that any type of attachment method or technique known in the art or yet to be developed may be used to couple or otherwise include lidar unit 330 to or in emergency vehicle warning device 390, including, using one or more fasteners, brackets, mounting plates, or any other suitable method of attachment.

Advantageously, system 300 may thus provide the option to a user to mount lidar unit 330 to an outside surface of vehicle 302 or to an emergency vehicle device, such as emergency vehicle device 390. Alternatively, it is also within the scope of the invention, as described herein, for lidar unit 330 to be included within a housing of emergency vehicle device 390.

Further, in certain embodiments, an emergency vehicle warning device control unit (not shown) used to control the functions and features of emergency vehicle warning device 390 may be designed to include one or more components of controller unit 320. Thus, in this embodiment, the control unit used to control emergency vehicle warning device 390 may also be configured to receive detection data from lidar unit 330, and may include a transceiver similar to transceiver 322 to do so. Further, this control unit of emergency vehicle warning device 390 may be coupled to or configured to include a speaker for sounding an audible alarm to notify an occupant of vehicle 302 of an oncoming intruder and/or alternatively flash warning lights from lights contained therein.

Controller unit 320 includes electric or electronic components for determining when to trigger the alarm (e.g. which may be emitted from speaker 342) upon detecting an intruder (e.g. intruder 106) or other object that enters a predetermined range surrounding vehicle 302. In one or more embodiments, controller unit 320 includes processor 323 that receives the detection data from the transceiver 322. The processor 323 can be any type of a processor suitable for processing such data, e.g., digital data. For example, the processor 323 can be a chip, a central processing unit (CPU), a computer board, or an electronic card. The processor 323 processes the detection data to determine the time to trigger the alarm sound and forwards the appropriate signal to the alarm sound device 340 to trigger the alarm.

The controller unit 320 may also be coupled to or may itself include at least one switch, such as ON/OFF switch 368. Switch 368 may be configured to power on and off controller unit 320. It is noted that a greater or lesser number of switches may be included in alternative configurations, and may be formed as any suitable type of switch (e.g. press buttons, toggle switches, etc.) known in the art.

As shown in FIG. 3, controller unit 320 may include an amplifier, such as amplifier 341 and a speaker, such as speaker 342. Amplifier 341 may amplify the signal from the processor 323 to trigger the alarm sound. The speaker 342 turns the amplified signal into an alarm sound. As described above, the alarm sound device 340 and the speaker 342 may be integrated with the controller unit 320 within a single device (for example, as shown in FIG. 4 in a non-limiting embodiment of controller unit 320). Alternatively, the alarm sound device 340 may be part of vehicle 302's own sound system. In yet another embodiment, the alarm sound device 340 is part of a third-party device, such as a portable computing device as described above, that can be connected to the controller unit 320 via any suitable wired connection or wireless link (e.g., Bluetooth link).

In addition to the above, controller unit 320 may include additional components, such as display 362. Display 362 may be any type of display known in the art that visually displays and indicates to the occupant of vehicle 302 a general area or position of an oncoming intruder who is approaching a side of vehicle 302. Display 362, as shown in FIG. 3, may be include a section or sections on the display that correlates to a zone or region by vehicle 302 to indicate to occupant 102 where oncoming intruder 106 may generally be located. For example, FIG. 2 illustrates four zones (e.g. zones 202-208) into which a 360-degree area around vehicle 202 in FIG. 2 is divided. As used herein, "a zone" is an area or region adjacent or near a vehicle, such as vehicle 302. In one or more embodiments, a zone may be a quadrant on a grid, such as grid 210 shown in FIG. 2. Lidar unit 330 may be configured to transmit data regarding a position of oncoming intruder 106, and that position may be correlated to a predetermined "zone" that is located proximate vehicle 302. Thus, "Zone 1" 363 as visually marked on display 362 of controller unit 320 may correlate to the region around vehicle 302 that correlates to "zone 1" 202 as shown in FIG. 2. Conversely, "Zone 2" 364 as visually marked on display 362 correlates to "Zone 2" 204 in FIG. 2, "Zone 3" 365 as visually marked on display 362 may correlate to "Zone 3" 206 in Figure, and "Zone 4" 366 may correlate to "Zone 4" 208 in FIG. 2. Thus, in one embodiment, lidar unit 330 is configured to divide an area surrounding vehicle 302 into quadrants (i.e. zones), and then this may be visually indicated via display 362 on controller unit 320 to occupant 102 which quadrant the detected intruder 106 may generally be located in.

As lidar unit 230 is rotating and detecting an intruder, such as intruder 106, lidar unit 230 may also determine a position of intruder 106 using its lidar based technologies to "see" and detect the intruder. Accordingly, using lidar IC 234, this data may be transmitted to controller unit 320 via transceiver 331 of lidar unit 330. Conversely, processor 323 may processes this data to determine that a particular zone (e.g. zones 363-366) on display 362 should be selected.

Further, in one or more embodiments, display 362 may include a light emitting diode (LED), including an LED from set of LEDs 371, associated with each zone, such that the LED from the set of LEDs 371 is configured to light up on display device 362 in a particular zone that the intruder 106 is detected in. For example, as shown in FIG. 4, LED in "zone 2" (i.e. 406) on controller unit 320 is shown as lit up, because an intruder 106 has been detected in zone 2. Thus, an occupant of vehicle 302 may be alerted that someone has approached vehicle 302 and is also located within "zone 2" so as to know where generally where to look to determine the threat risk of the approaching person.

FIG. 4 shows an exemplary pictorial embodiment of a controller unit such as controller unit 320 coupled to a lidar unit 320. Those of ordinary skill in the art will appreciate that these devices as pictured are exemplary, and that the design and form of these devices may vary from those shown in FIG. 4. Further, while not illustrated in FIG. 4, it is to be understood, controller unit 320 and lidar unit 330 may be mounted on their respective surfaces on a vehicle, such as vehicle 302. Controller unit 320 and lidar unit 330 may be connected, in one or more embodiments, via wires that are strategically connected by those of ordinary skill in the art within a body and/or headliner of vehicle 302. Alternatively, controller unit 320 and lidar unit 330 may be wirelessly connected using one or more wireless technologies known in the art.

FIG. 4 shows an exemplary embodiment of display 362 for controller unit 320 in FIG. 3. Display 362 is located on a front surface of controller 320. FIG. 4 shows that display 362 may be presented in the form of grid 402. Grid 402 includes labels "Zone 1," "Zone 2", "Zone 3", and "Zone 4" separated into respective quadrants on grid 402. Further, each zone on grid 402 includes an LED, such as LED 406. An LED, such as LED 406, may be included in controller unit 320 for each zone on grid 402 and may light up when an intruder, such as intruder 106 is detected in that particular zone, and therefore indicate to an occupant of vehicle 302 which zone to look towards. Thus, an LED, such as LED 406, provides further visual alert mechanisms to alert the occupant of a stationary vehicle of the oncoming person or object, and a general zone to look to in order to assess who or what is approaching the stationary vehicle.

Controller unit 320, as shown in FIG. 4, further includes user switch 368 for powering on and off controller unit 320. In some embodiments, user switch 368 may also be used to power on and off lidar unit 330. In some embodiments, user switch 367 may be included for every lidar unit 330. Alternatively, in other embodiments, lidar unit 330 may be programmed to self-activate upon putting vehicle 302 in park mode. Occupant 102 may selectively choose to power on controller unit 320 when occupant 102 may be in a possible scenario where it would be beneficial to have controller unit 320 activated.

FIG. 4 further illustrates that controller unit 320 may also include speaker 342 for emitting a loud alarm from speaker 342 if an intruder, such as intruder 106 is detected entering any of the four zones as indicated on grid 402 of display 362. It is an objective of the present description that the alarm sound emitted by speaker 342 be of a sufficient loudness to be heard by occupant 102, even over the typical noises heard in traffic whether located in the city, in a rural setting, on a highway or elsewhere. It is intended that the warning alarm emitted by speaker 342 in controller unit 320 be loud enough to both catch the attention of the occupant of vehicle 302 and to also try and scare away any potential intruders.

In one or more embodiments, the alarm sound emitted by speaker 342 may be at least 90 decibels (dB). It is noted that the alarm sound emitted from speaker 342 may be higher or lower than 90 dB. It may be preferable for the alarm sound to be at least 114 dB or higher. In one or more embodiments, the duration of alarm sound may be predetermined by a manufacturer or may be selected by a user.

In an embodiment, the alarm sound can change with time as the distance between the oncoming person and the stationary vehicle is closing. For instance, controller unit 320 can signal the sound of the alarm to increase in intensity or frequency of the alarm sound as the distance is closed in by the intruder 106 with respect to stationary vehicle 302. This increase in intensity or frequency of the alarm sound may help to communicate a sense of urgency to occupant 102 located within stationary vehicle 302.

It is noted that in one or more configurations, a user is able to turn on and off both lidar unit 330 and controller unit 320. As noted above, system 300 may be collocated within a single apparatus or device, or may be individual components, such that lidar unit 330 and controller unit 320 may be coupled to one another either using wires or wirelessly on separate devices. Either way, in one or more embodiments, each device may be powered on or off so that the intruder detection and warning system 300 shown in FIG. 3 is activated as needed by the user. For example, those of ordinary skill in the art will appreciate that a police officer, security guard, construction worker, EMS worker, or any other type of person may not require that the system 300 be activated during regular driving or transportation from place to place. Further, a user may desire to deactivate or turn off system 300 when the vehicle is parked in a residential neighborhood so as not to disturb the residents, for example, or during broad daylight hours and located in a busy neighborhood with a lot of people passing by and where lidar unit 330 would be constantly detecting false "intruders".

It may be the case that the intruder detection and warning system 300 presented in FIG. 3 (and elsewhere in the present description) may be the most useful when a user's vehicle is parked in a rather solitary location or other environment where user is vulnerable to risk or attack by an oncoming intruder who may intend harm to the occupant of the parked vehicle. For example, if someone is located in a high crime neighborhood, or parked at night in an isolated or remote area, it may be more desirable to have activated lidar unit 330 and controller unit 320, just in case anyone happens to approach the vehicle and the occupant is caught off guard.

Figure 5:
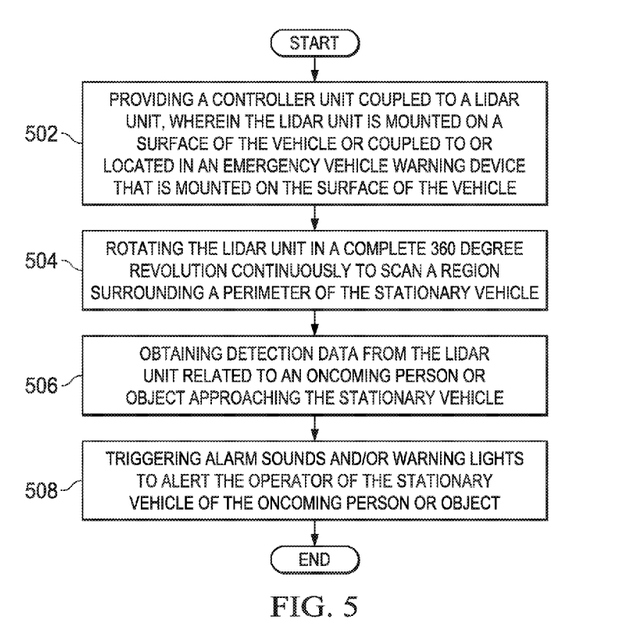
FIG. 5 is a flowchart illustrating a process for detecting and warning an operator of a stationary vehicle of an intruder approaching a vehicle in accordance with an illustrative embodiment

Turning to FIG. 5, FIG. 5 is a flowchart illustrating a process for detecting and warning of oncoming intruders or other objects approaching a stationary vehicle. The process described in FIG. 5 may utilize one or more components of the shown in FIGS. 1-4 described above, such as, without limitation, the components of lidar units 110 and 330 and controller units 112 and 320.

In one exemplary embodiment, the process may correspond to detecting an oncoming person or object approaching an operator of a stationary vehicle, such as in the case of the scenario described in FIG. 1 and FIG. 2. The process may begin by providing a controller unit coupled to a lidar unit, whereby the controller unit and the lidar unit are mountable to a surface of the stationary vehicle (step 502). Alternatively, lidar unit may be mounted on or located within an emergency vehicle warning device. The controller unit, such as controller unit 112 or controller unit 320, may be activated by a user using an ON/OFF switch (e.g. switch 368), which may also activate a lidar unit, such as lidar unit 330, in one or more embodiments.

Next, the process may include continuously rotating the lidar unit in a complete 360-degree revolution to scan a region surrounding a perimeter of the stationary vehicle (step 504). The lidar unit, including lidar unit 320 may be configured to include a detection range (which may be programmable and variable as desired by the user or may be pre-determined by the manufacturer settings) and to detect a speed and distance of an oncoming moving person or object with respect to the stationary vehicle. The lidar unit, may include a motor, such as motor 336 which is coupled to a body of the lidar unit and causes the lidar unit to rotate in a full 360-degree direction.

The controller unit may obtain detection data from the lidar nit and continuously check whether an oncoming moving person or object is detected over a particular range from the stationary vehicle (step 506). Further, the controller unit may determine which zone (e.g. zones 202-208 as shown in FIG. 2) the oncoming person or object is located in, whereby each zone correlates to an assigned area with respect to the stationary vehicle.

When an oncoming person or object or animal (without limitation) is detected, the alarm sound and/or one or more warning lights may be triggered (step 508). In some embodiments, the alarm sound may be emitted from a controller unit, such as controller unit 320. In some embodiments, the alarm sound may be emitted from an emergency vehicle warning device. Further, the one or more warning lights, when triggered, may light up in a steady or flashing mode from any number of emergency vehicle warning devices coupled to the surface of the stationary vehicle. In yet another embodiment, the alarm sound may be emitted from a portable computing device associated with an occupant of the stationary vehicle (e.g., a smartphone, smart communications device, or any type of computing device as known in the art). Additionally, the one or more warning lights (if selected to be triggered or programmed to be automatically triggered) may be emitted from any of the emergency vehicle warning devices coupled to the stationary vehicle.

In one embodiment, the controller unit waits for the lidar unit to receive a signal indicating the presence of an oncoming moving person or object. When such an oncoming moving person or object is detected, the lidar unit can signal the controller unit. The alarm sound may be emitted from a speaker located in or coupled to the controller unit. Further, the controller unit may include a display for displaying visually to the operator of the stationary vehicle a position of the oncoming intruder or object with respect to a particular zone associated with the stationary vehicle.

Beneficially, one or more embodiments of a vehicle detection and warning system as described herein may provide an occupant of a stationary vehicle with a warning and enough time to reach if an approaching moving person appears to be dangerous and intending harm to the occupant of the stationary vehicle. Advantageously, the embodiments of the detection and warning system presented herein may save the lives of many individuals, including police officers, EMS, public safety, construction, and security armed car personnel. It may also be used by ordinary citizens who would like to further protect themselves and their family members in case they find themselves in isolated locations and need to be warned of oncoming people.

The flowchart and block diagrams in the figures illustrate the architecture, functionality, and operation of possible implementations of the controller and light system components according to various embodiments. The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations may be made to these embodiments without departing from the broader spirit and scope of the invention as set forth in the claims. It is also understood that other embodiments may be utilized and that logical structural, mechanical, chemical, and/or electrical changes may be made without departing from the spirit or scope of the invention.

What is claimed is:

1. A system for alerting an occupant located within a vehicle, the system comprising:
a lidar unit having a housing, wherein the lidar unit is configured to detect an oncoming intruder, animal, or object with respect to a stationary vehicle, wherein the lidar unit is attachable to a top surface of the stationary vehicle or included within an emergency vehicle warning device that is mountable to the external surface of the stationary vehicle, the housing of the lidar unit further comprising:
a processor configured to receive lidar detection data about the oncoming intruder, animal, or object, wherein the lidar detection data indicates at least one of speed and distance of the oncoming intruder, animal, or object with respect to the stationary vehicle; and
a controller unit having a housing, wherein the controller unit is configured to receive the detection data about the oncoming intruder, animal, or object and configured to alert the occupant with the vehicle by sounding an audible alarm or triggering one or more warning lights or triggering both an audible alarm and the one or more warning lights, the housing of the controller unit further comprising:
a transceiver coupled to the processor of the lidar unit and configured to receive the lidar detection data from the lidar unit;
one or more speakers for sounding the audible alarm;
a display adapted to display a set of pre-determined zones of detection associated with the vehicle, wherein the lidar unit is configured to detect a position of the oncoming intruder, animal, or object and is configured to correlate the position of the oncoming intruder, animal, or object to a particular zone from among the set of pre-determined zones of detection associated with the vehicle.

2. The system of claim 1, wherein the display displays a grid for the pre-determined zones of detection associated with the vehicle, wherein each zone of the pre-determined zones of detection correlates to a quadrant on the displayed grid.

3. The system of claim 1, wherein the lidar unit is configured to send the lidar detection data to the transceiver of the controller unit.

4. The system of claim 1, wherein the controller unit is configured to trigger the audible alarm to be emitted from a smartphone, smart communications device, or any type of computing device associated with the occupant.

5. The system of claim 1, wherein one or more emergency vehicle warning devices may be coupled to a surface of the stationary vehicle, and wherein the one or more warning lights are located in the one or more emergency vehicle warning devices, and wherein the controller unit is configured to trigger the audible alarm or the one or more warning lights from any one of the emergency vehicle warning devices.

6. The system of claim 1, wherein the controller unit is coupled to an alarm sound device, wherein the alarm sound device comprises a speaker.

7. The system of claim 1, wherein the lidar unit further comprises a GPS system and an Inertial Measurement Unit.

8. A method of warning an operator of stationary vehicle of an oncoming person, animal, or object, comprising:
providing a controller unit coupled to a lidar unit, wherein the lidar unit detects motion of the oncoming person, animal, or object approaching a stationary vehicle, wherein the lidar unit is mounted on a surface of the stationary vehicle or coupled to or located in an emergency vehicle warning device that is mounted to the surface of the stationary vehicle;
rotating a body of the lidar unit continuously in a complete 360-degree revolution to scan a region surrounding a perimeter of the stationary vehicle;
obtaining, from the lidar unit, detection data for the oncoming person, animal, or object approaching the stationary vehicle; and
triggering an alarm sound to alert the operator of the stationary vehicle of the oncoming person or object; and
displaying a detected location of the oncoming person, animal, or object on a display located on the controller unit and near the operator of the stationary vehicle.

9. The method of claim 8, further comprising, triggering one or more warning lights to alert the operator of the stationary vehicle of the oncoming person, animal, or object.

10. The method of claim 8, wherein the detection data further comprises a location of the oncoming person, animal, or object with respect to a particular zone in relation to the stationary vehicle.

11. The method of claim 8, further comprising, displaying the location of the oncoming person, animal, or object on the display with respect to a particular zone on the display, wherein an occupant of the vehicle is alerted as to the location of the intruder or object with respect to the stationary vehicle.

12. The method of claim 8, further comprising, positioning the controller unit proximate to a driver within the stationary vehicle, wherein the controller unit is mounted to an internal surface of the stationary vehicle.

13. An apparatus for alerting an occupant of a stationary vehicle, the apparatus comprising:
a controller unit configured for vehicle related intrusion detection related to the stationary vehicle, wherein the controller unit is connectable to a lidar unit mountable on the stationary vehicle, wherein the controller unit is configured to receive detection data from the lidar unit indicating an oncoming intruder, animal, or object and to trigger an alarm sound or one or more warning lights or both in accordance with the detection data; and
a display for displaying a position of the oncoming intruder, animal, or object with respect to the stationary vehicle.

14. The apparatus of claim 13, wherein the apparatus further comprises or is coupled to a sound device comprising a speaker for sounding the alarm sound, and wherein the one or more warning lights are included in one or more emergency vehicle warning devices coupled to a surface of the stationary vehicle.

15. The apparatus of claim 13, wherein the lidar unit and the controller unit are collocated in a single device.

16. The apparatus of claim 13, wherein the controller unit is mountable on an internal surface proximate to the operator of the vehicle and wherein the lidar unit is mountable to a surface of the stationary vehicle or coupled to or located in an emergency vehicle warning device.

* * * * *